United States Patent [19]

Lapsley et al.

[11] Patent Number: 5,564,773
[45] Date of Patent: Oct. 15, 1996

[54] PICKUP TRUCK BED COVER

[75] Inventors: Robert M. Lapsley; George Kalis, Jr., both of Wooster, Ohio

[73] Assignee: Stahl/Scott Fetzer Company, Wooster, Ohio

[21] Appl. No.: 356,698

[22] Filed: Dec. 15, 1994

[51] Int. Cl.$^6$ .................................................. B60P 7/02
[52] U.S. Cl. ............................................................ 296/100
[58] Field of Search ................................. 296/100, 101

[56] References Cited

U.S. PATENT DOCUMENTS

| | | | |
|---|---|---|---|
| 2,992,040 | 7/1961 | Groth et al. | 296/100 |
| 3,578,378 | 5/1971 | Anderson | 296/100 |
| 3,640,565 | 2/1972 | Anderson | 296/100 |
| 3,765,717 | 10/1973 | Garvert | 296/100 |
| 4,909,561 | 3/1990 | Lovaas | 296/100 |
| 5,067,766 | 11/1991 | Lovaas | 296/100 |
| 5,088,636 | 2/1992 | Barajas | 296/100 |
| 5,183,309 | 2/1993 | Jordan | 296/100 |

FOREIGN PATENT DOCUMENTS

| | | |
|---|---|---|
| 604940 | 9/1960 | Canada . |
| 2205282 | 12/1988 | United Kingdom . |

*Primary Examiner*—Joseph D. Pape
*Attorney, Agent, or Firm*—Watts, Hoffmann, Fisher & Heinke

[57] ABSTRACT

A vehicle bed cover including a frame connected to a bed of a vehicle. A first cover portion is supported on the frame. The first cover portion extends over substantially one-half of the longitudinal extent of the bed. The first cover portion includes a pair of gull-wing doors pivotable in opposite directions about a central support of the first cover portion. The central support extends in a direction substantially parallel to the longitudinal extent of the bed. A second cover portion is slidably supported by the guide frame for telescoping movement between a first position covering substantially another one-half of the bed and a second position located under the first cover portion. An end panel on said second cover portion is pivotable relative to the second cover portion to a closed position to prevent access to the bed.

13 Claims, 7 Drawing Sheets

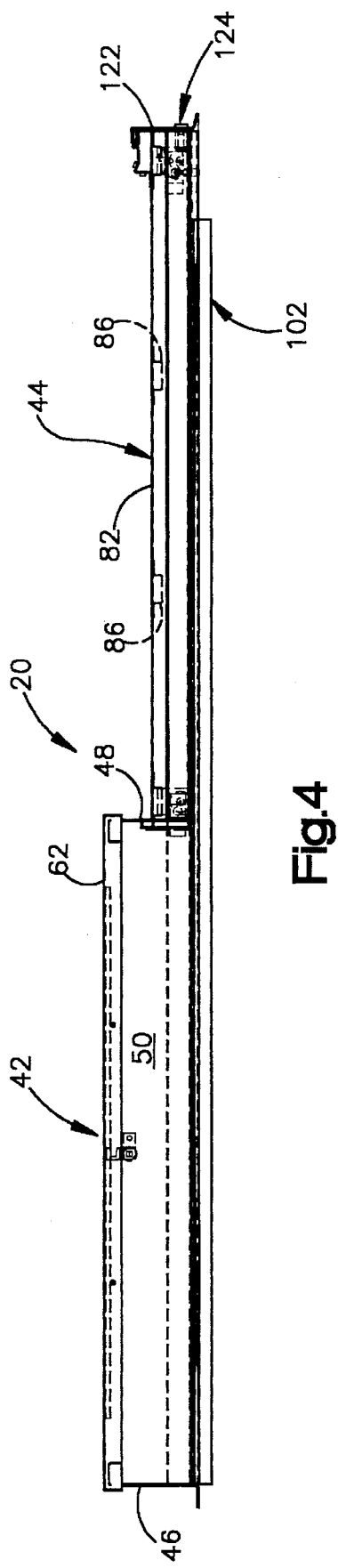
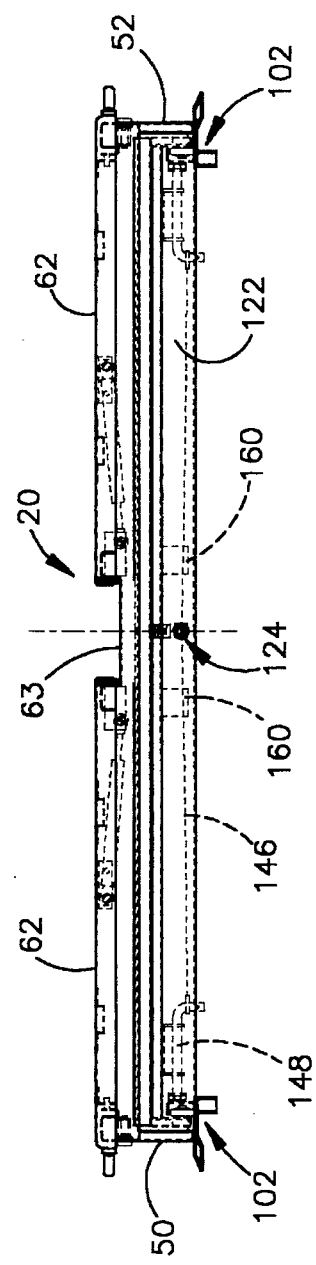
Fig.4
Fig.5

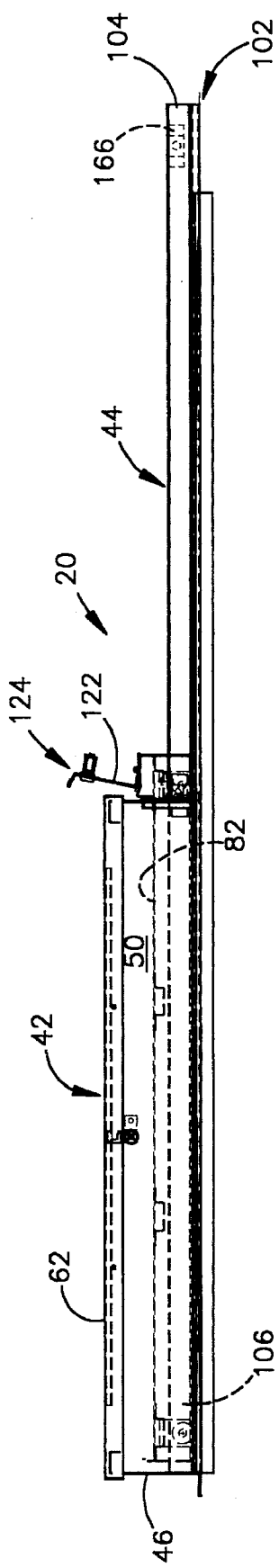
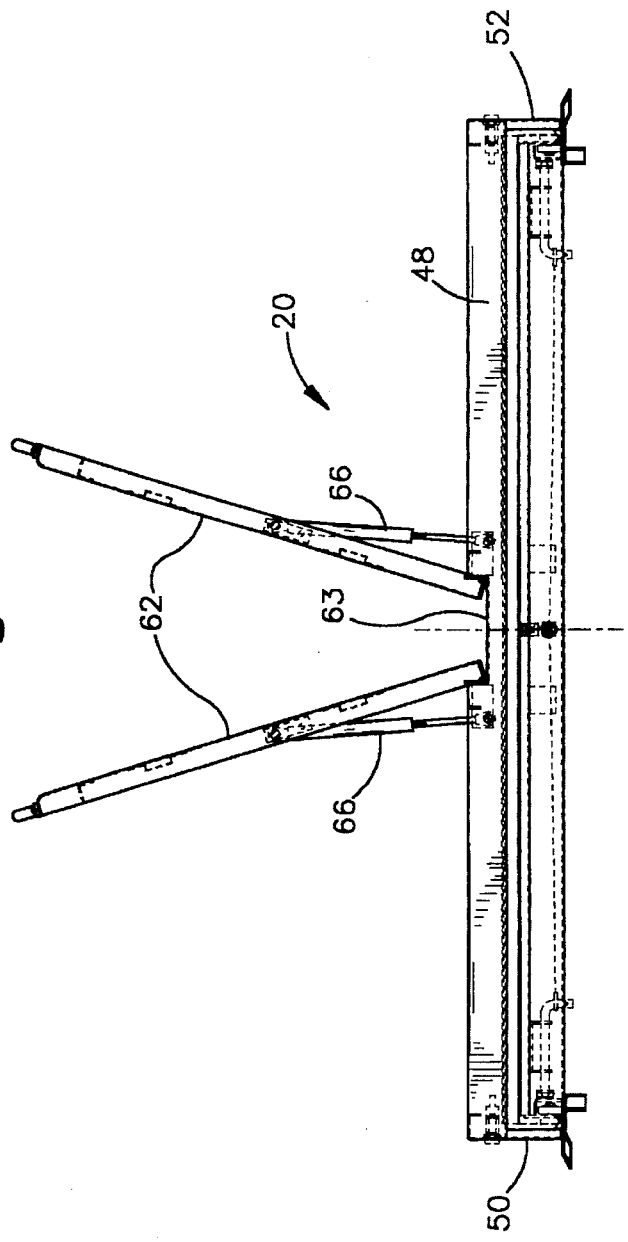
Fig.6
Fig.7

PICKUP TRUCK BED COVER

BACKGROUND OF THE INVENTION

1. Technical Field

The present invention relates generally to a cover for a pickup truck bed. In particular, the present invention relates to a low height securable cover having one section with a sliding telescopic cover portion and another section with a pair of upwardly pivoting cover portions.

2. Description of the Prior Art

Covers and caps for pickup truck beds are known. Caps often impede the visibility out the back of a pickup truck cab and create wind resistance which can adversely affect fuel economy of the vehicle. Covers having doors which telescope to cover and uncover a portion of a respective truck bed are disclosed in U.S. Pat. Nos. 3,578,378; 3,640,565; 4,909,561 and 5,067,766. The covers disclosed in these patents have cover portions which telescope from a closed position to an open position in which approximately one half of the pickup bed is uncovered.

Other covers for pickup truck beds are disclosed in U.S. Pat. Nos. 3,765,717 and 5,183,309. The covers disclosed in these patents have hinged access panels or doors which pivot upwardly to permit access to at least a portion of one side of a pickup truck bed. A lockable toolbox is disclosed in U.S. Pat. No. 5,088,636. However, this type of toolbox often does not permit the full utilization of the portion of the truck bed that it covers for storage and, thus, wasted space exists.

None of the known prior art covers and toolboxes provide easy access to every portion of a-pickup truck bed and secure lockable storage of the entire bed while providing the option of also transporting items that may extend above the sides of the pickup truck bed.

SUMMARY OF THE INVENTION

The cover of the present invention permits easy access to every portion of a pickup truck bed, provides a cover that is lockable to offer secure storage for items located in the truck bed and permits the transportation of items which may extend above the height of the pickup truck bed sides. The cover of the present invention is relatively low to permit excellent visibility out the back of the pickup truck cab and does not increase wind resistance when compared to known caps.

A cover embodying the present invention includes a first stationary cover portion that is connectable to a bed of a vehicle, such as a pickup truck. The first cover portion extends over substantially the forward one-half of the longitudinal extent of the vehicle bed. The first cover portion includes at least one access panel supported to pivot to an open position that allows access to the one-half of the vehicle bed. A second cover portion is slidably supported by the vehicle bed for telescoping movement between a closed position covering substantially the other half of the vehicle bed and an open position under the first cover portion to allow access to the rear half of the vehicle bed.

The vehicle bed cover includes a frame connected to a bed of a vehicle. The second cover portion is slidably supported by the frame for telescoping movement between the first position covering substantially one-half of the bed to a second position located under the first cover portion.

A pair of gull wing doors are pivotably mounted about a central support of the first cover portion to allow access to the sides of the forward half of the vehicle bed when pivoted to an open position. The central support extends in a direction parallel to the longitudinal extent of the vehicle bed.

The second cover portion includes an end panel that pivots relative to the second cover portion to selectively inhibit or allow access to the vehicle bed when the end panel is in a closed position or open position, respectively. The end panel further includes a lock to prevent pivoting of the end panel to an open position and an actuator for controlling movement of a plunger into or out of a portion of the frame to block or permit movement of the second cover portion.

A storage bin may be provided under the gull wing doors in the first cover portion and is partially supported by a floor of the vehicle bed. The storage bin is also partially supported by the first cover portion. A tailgate lock that is attachable to the vehicle bed and tailgate is provided to prevent the tailgate from moving to an open position which would allow access to the vehicle bed.

BRIEF DESCRIPTION OF THE DRAWINGS

Further features of the present invention will become apparent to those skilled in the art to which the present invention relates from reading the following specification with reference to the accompanying drawings, in which:

FIG. 4 is a left side elevational view of the cover in FIG. 3, taken approximately along the line 4–4 in FIG. 3;

FIG. 5 is a rear elevational view of the cover in FIG. 3, taken approximately along the line 5–5 in FIG. 3;

FIG. 6 is a view similar to FIG. 4 with parts in different open positions;

FIG. 7 is a view similar to FIG. 5 with parts in different open positions;

DESCRIPTION OF A PREFERRED EMBODIMENT

Figure 1:
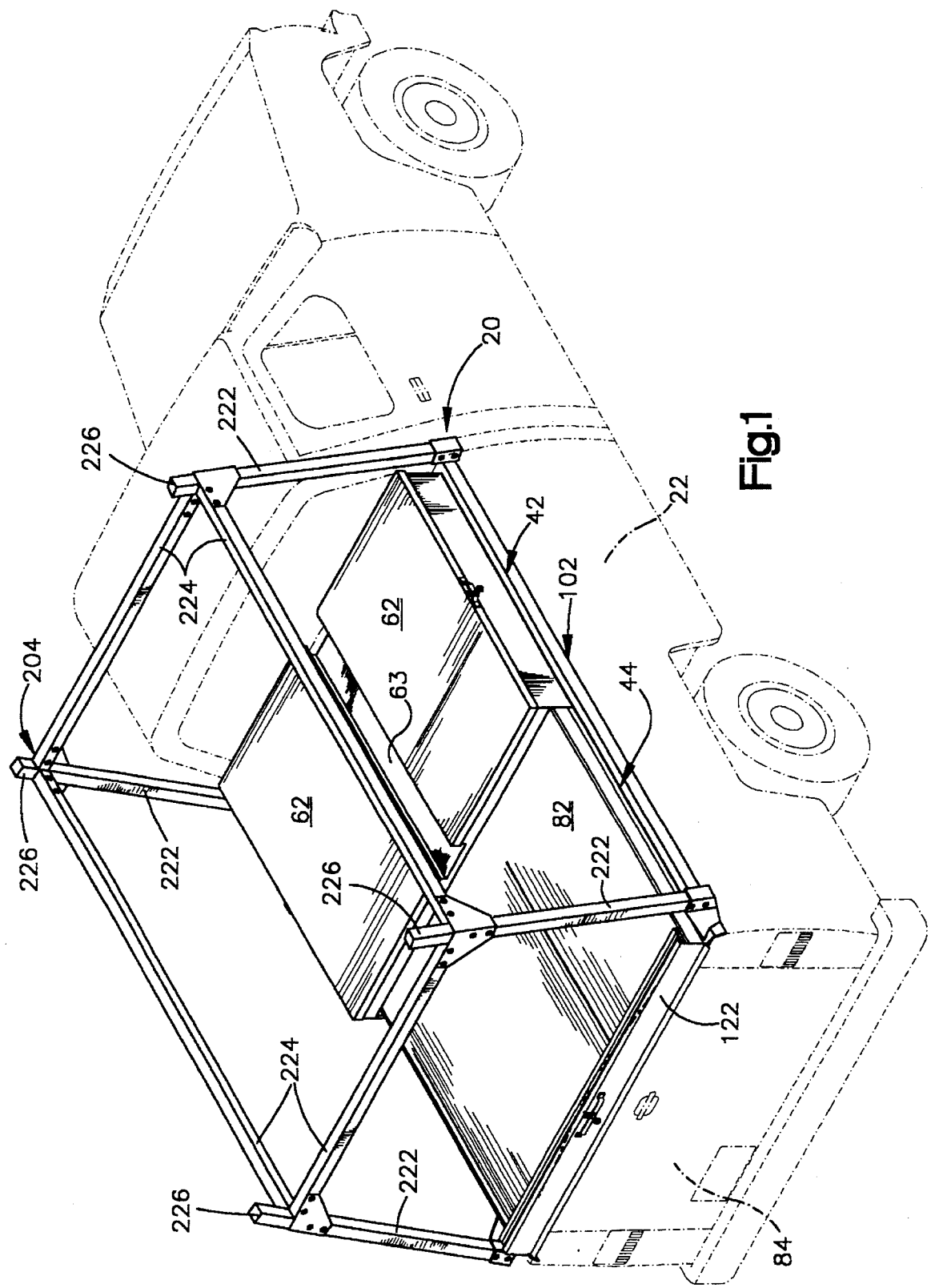
FIG. 1 is a perspective view of a pickup truck having a cover of the present invention attached to a bed of the truck and which cover is illustrated in a closed position.

A cover 20 embodying the present invention is illustrated in FIG. 1. As shown, the cover 20 is for use on a pickup truck bed 22. The cover 20 provides secure storage of items in the pickup truck bed 22 yet allows use of and access to, virtually all space in the truck bed. The cover 20 has a relatively low vertical height so little or no wind resistance is added by the cover and maximum visibility out the back of the truck cab is permitted.

The cover 20 includes a front portion 42 and a rear portion 44 both of which extend over approximately a respective one-half of the longitudinal extent of the pickup truck bed 22. The from portion 42 of the cover 20 includes a front 46, back 48 and sides 50, 52. The front portion 42 of the cover 20 also includes a pair of gull-wing doors 62 or access panels.

Figure 2:
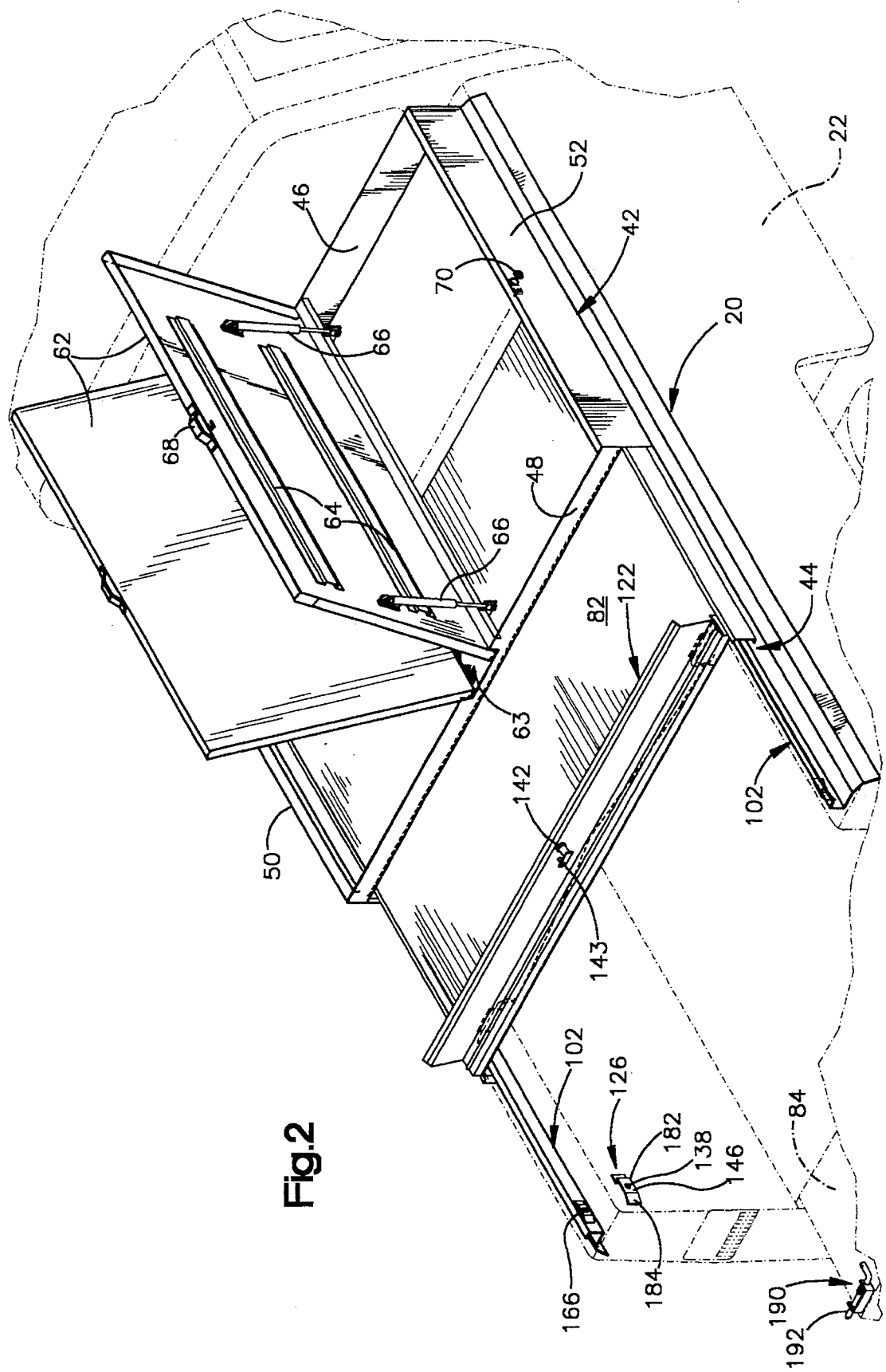
FIG. 2 is an enlarged perspective view, similar to FIG. 1, with parts removed for clarity and illustrated in different open positions.

The gull-wing doors 62 pivot upwardly about a center support 63 from the closed position illustrated in FIGS. 1, 4 and 5 to the open position illustrated in FIGS. 2 and 7. The center support 63 extends in a direction substantially parallel to the longitudinal extent of the truck bed 22 between the front 46 and back 48. With the gull-wing doors 62 pivoted upwardly to the open position, each side of the front one-half of the truck bed 22 is readily accessible to retrieve items from or place items into the bed. Such a covered area in the front of the truck bed 22 is typically used to securely store items such as tools, parts and the like.

Each gull-wing door 62 includes a pair of reinforcing members 64 and a pair of lift assist cylinders 66. Each lift assist cylinder 66 provides fluid or spring assist to lessen the effective weight of the door 62 that must be manually pivoted upwardly and holds the door in the fully opened position. Each gull-wing door 62 has a handle 68 and a lock 70 for securing the door in a closed position to prevent unauthorized access to the front storage portion of the bed 22.

The rear portion 44 of the cover 20 includes a telescoping door 82. The telescoping door 82 slides under the front portion 42 of the cover 20 to allow access to the rear storage area of the pickup truck bed 22. This open position of the telescoping door 82 provides easy access to the relatively large rear storage area, especially with the tail gate 84 of the pickup truck bed 22 down or open, as illustrated in FIG. 2. Such a rear storage area can be used with the telescoping door 82 open to transport items which are taller than the sides of the pickup truck bed 22. The telescoping door 82 includes a plurality of reinforcing members 86 and an upwardly extending lip 88 at the front end.

Figure 3:
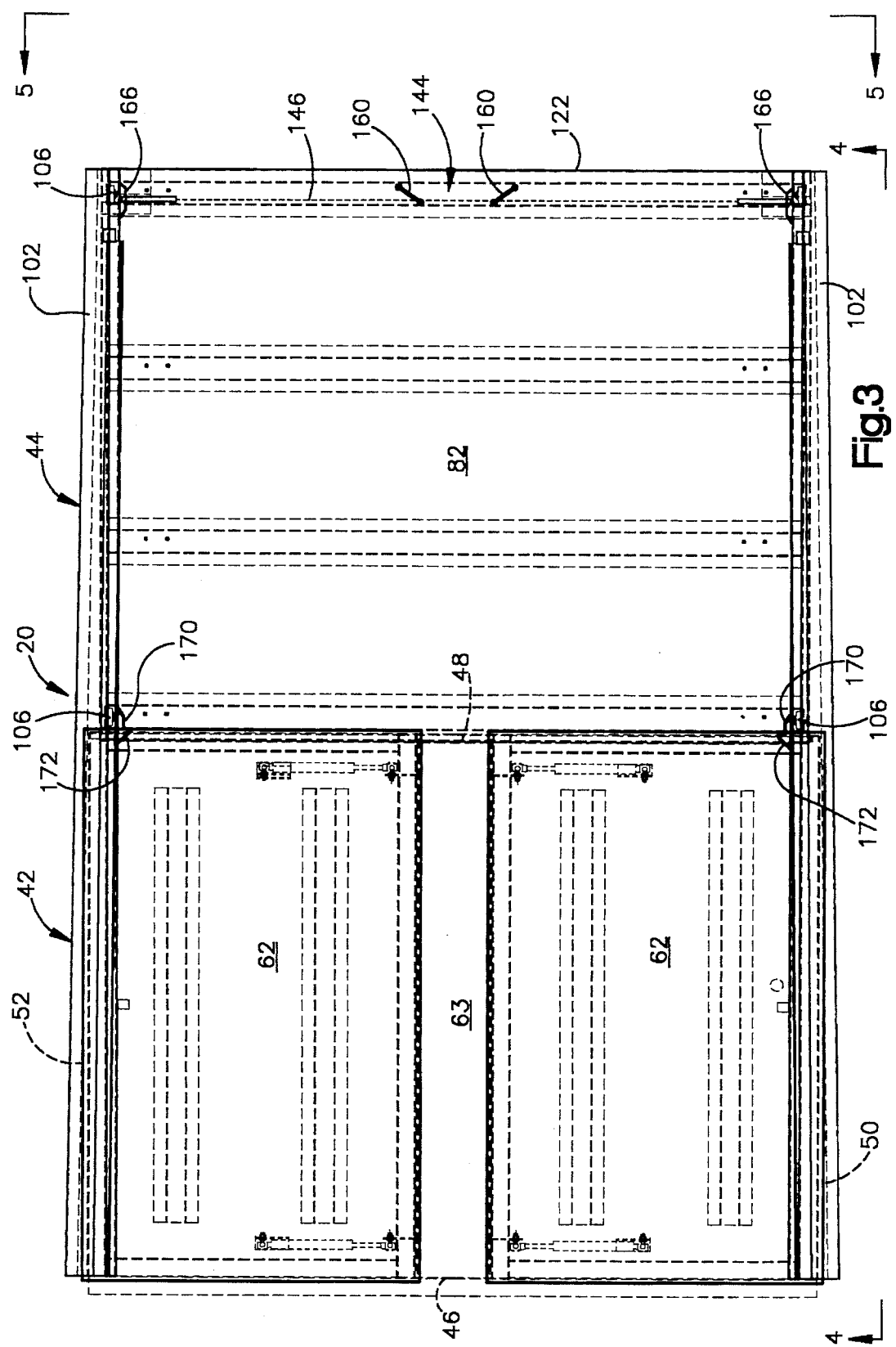
FIG. 3 is a top plan view of the cover in FIG. 1.

As illustrated in FIGS. 3–5, the cover 20 is supported on the pickup truck bed 22 by a guide frame 102 (FIG. 2). The guide frame 102 is attached to a respective upper surface of the sides of the truck bed 22. The guide frame 102 provides a track for the telescoping door 82 of the rear portion 44 to slide on, inhibit sideways movement of the telescoping door and provide securement for both front and rear portions 42, 44 of the cover 20 to the truck bed 22.

The guide frame 102 includes a pair of C-shaped channel members 104 (FIG. 8) in which rollers 106 of the telescoping door 82 may ride so that easy opening and closing of the telescoping door is provided, but is restrained to move along a predetermined longitudinal path of travel. The guide frame 102 also includes a deflector surface 108 on each channel member 104, which directs water away from the truck bed 22. An angle member 110 is provided for attaching the frame 102 to the bed 22 to prevent movement therebetween and for locating the cover 20 during installation.

Figure 10:
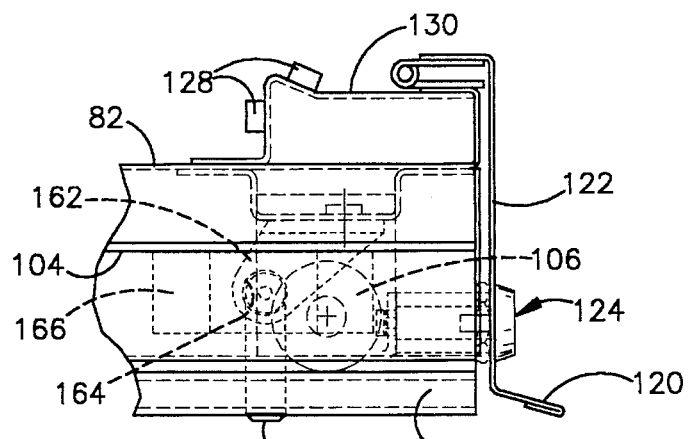
FIG. 10 is an enlarged side view of a rear end portion of the cover in FIG. 4.

The telescoping door 82 has a pivotable rear panel 122 which, when combined with a splash panel 120, a lock assembly 124 and a tailgate lock assembly 126 (FIG. 2) accessible only from the inside of the bed 22 and described below, allows secure storage of items in the pickup truck bed 22. When the rear end panel 122, is closed, as illustrated in FIGS. 1 and 4, and both lock assemblies 124, 126 are locked, free access to the truck bed 22 is prevented. Bumpers 128 (FIG. 10) on a raised rear portion 130 of the telescoping door 82 contact the rear panel 122 to stop pivoting travel at a predetermined location and back 48 of the first cover portion 42 to stop sliding of the telescoping door.

The lock assembly 124 (FIGS. 5 and 10) for the rear end panel 122 includes a key rotatable cylinder 142 to selectively permit or inhibit pivoting of the rear panel to an open position. The lock cylinder 142 has a radially projecting plate 143 (FIG. 2) that engages the inside of the tailgate 84 to block opening of the rear end panel 122. The plate 143 is rotatable to a position in which it will not contact the tailgate 84 to permit the rear end panel 122 to pivot open.

Figure 8:
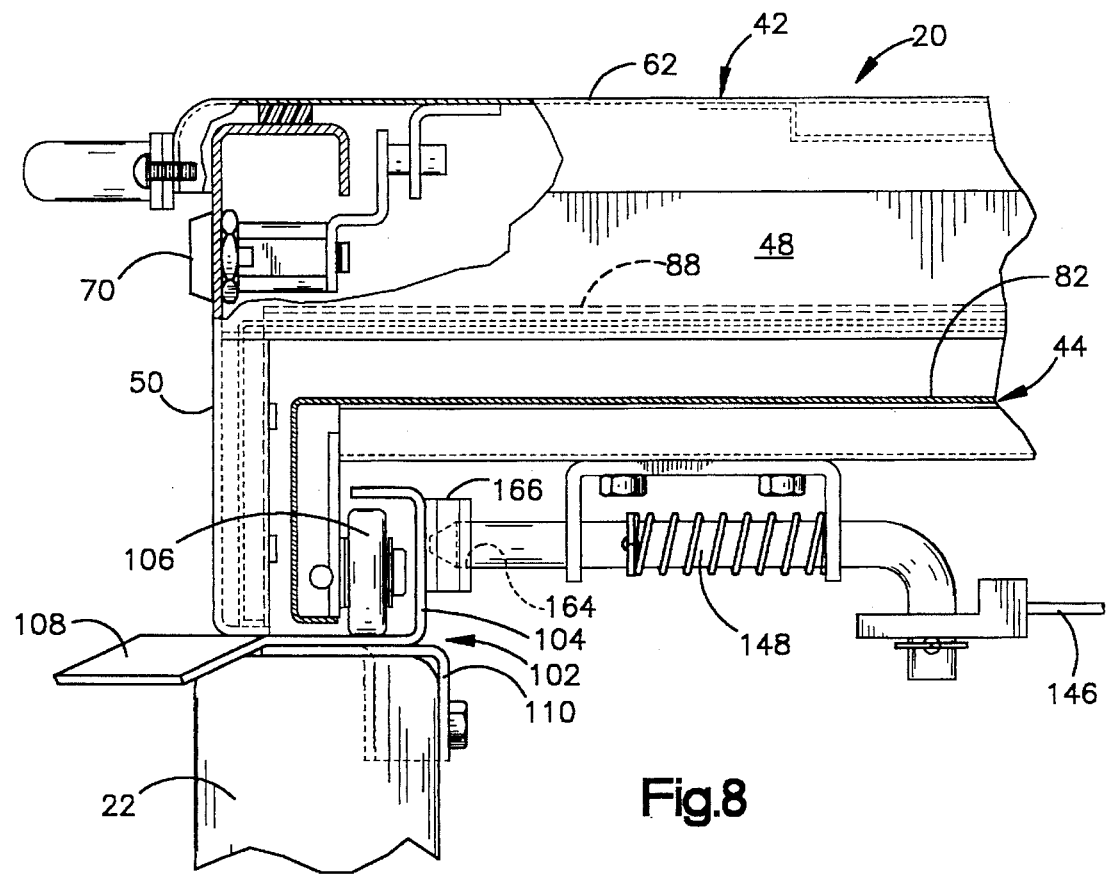
FIG. 8 is an enlarged view of a left end portion of the cover in FIG. 5.

A lock actuator assembly 144 is manually actuated to enable the telescoping door 82 to slide. The lock actuator 144 includes a cable 146 which is supported at its central portion by U-shaped brackets 160 (FIG. 3). The outer ends of the cable 146 are operably connected to a pair of L-shaped plungers 148 (FIGS. 2 and 8). Each L-shaped plunger 148 is supported by the telescoping door 82 by brackets 162 which also provides support for the outer ends of the cable 146. The bracket 162 directs the outwardly biased axial movement of the L-shaped plunger 148 into or out of a reinforced opening 164 (FIG. 8) of a striker 166 attached to the C-shaped channel 104 of the frame 102.

Figure 9:
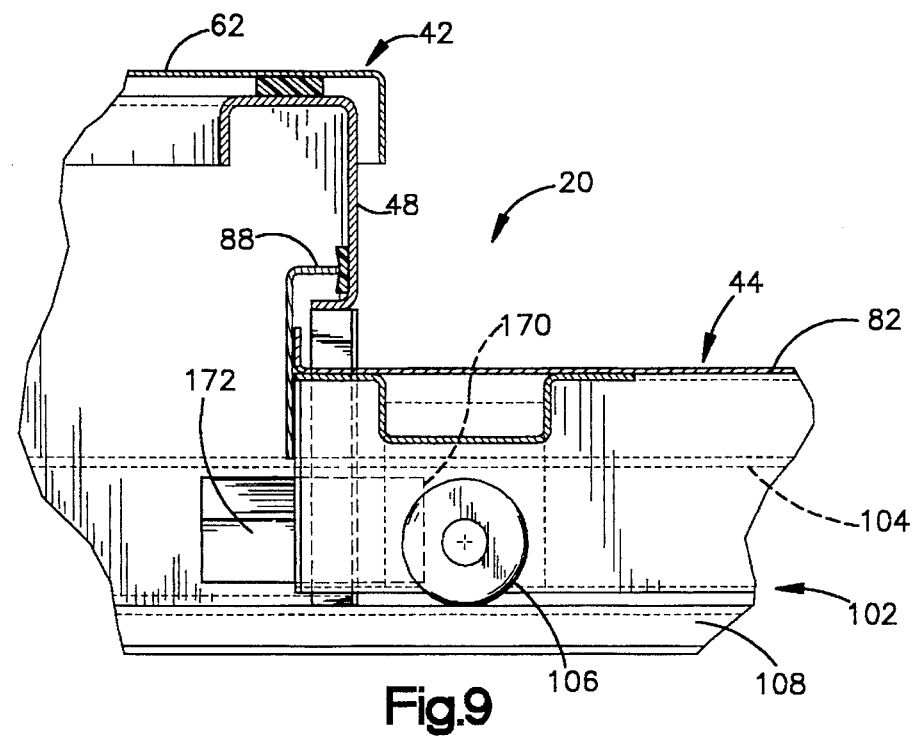
FIG. 9 is an enlarged side view, partially in section, of a mid-portion of the cover in FIG. 4.

The striker 166 is located near the rearward end of each channel 104 so the telescoping door 82 can be locked when it is fully closed to block sliding movement in either direction. The central portion of the cable 146 is pulled manually to overcome the biasing force and move the plungers 148 out of the striker 166 to allow the door 82 to move. The cover 20 also includes a ramped striker 170 (FIGS. 3 and 9) and stopper 172 at a forward travel limit on the guide frame 102 to stop and hold the telescoping door 82 at a forward open position.

The tailgate lock 126 includes a pair of striker plates 182. Each striker plate 182 (FIG. 2) is attachable to the inside of the truck bed 22 near the tailgate 84. Each striker plate 182 has a ramped portion 184 and a main portion 146 with an opening 138. A pair of latch pins 190 are attached to a respective longitudinal end portion of the tailgate 84 and each latch pin has a conical end portion that rides along the ramped portion 184 of the striker plate 82 as the tailgate is being shut and enters the opening 188 to prevent pivoting of the tailgate to an open position. To release the tailgate lock 126, each latch pin 190 is pulled from the opening 188 in the striker plate 182 so the tailgate 84 can be pivoted open.

When the rear end panel 122 is down and locked and the tailgate lock 126 is engaged, access to the rear storage area of the truck bed 22 is denied. When the rear end panel 122 is pivoted to the open position, as illustrated in FIGS. 2 and 6, the telescoping door 82 can be slid to the open position at which access to the rear portion of the bed 22 is accessible. The telescoping door 82, when it is in its open position, is intended to be located or nested between the C-shaped channel 104 of the guide frame 102 and the two gull-wing doors 62 of the front cover portion 42. Thus, when the telescoping door 82 is in this open position, access to the from storage area below the gull-wing doors 62 is denied but access is available to the rear storage portion of the bed 22.

Figure 11:
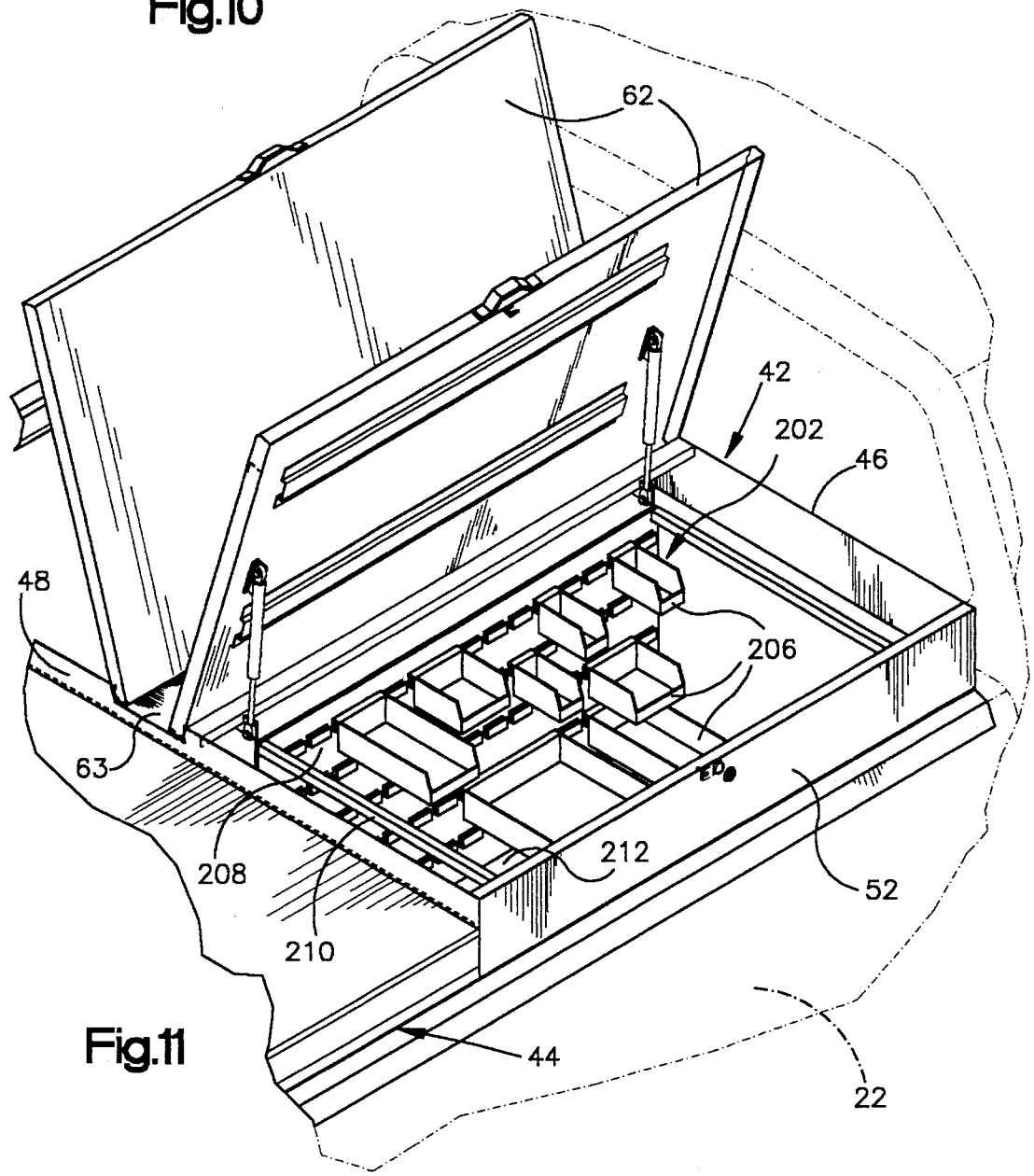
FIG. 11 is a perspective view of a storage bin assembly locatable under a front portion of the cover.

Optional items such as a storage bin arrangement 202 (FIG. 11) and a ladder rack 204 (FIG. 1) provide additional storage capabilities and organization for the cover 20. The ladder rack 204 includes four upwardly extending posts 222 attached to the frame 102. The posts 222 support four horizontally extending beams 224. Large items, such as ladders, can be supported on the beams and secured by upper portions 226 of the posts to block movement of the items.

Storage bins 206 of various sizes are fixed to a sheet 208 which is supported by the truck bed 22. The sheet 208 is supported longitudinally by bars 210 attached to the front cover portion 42. The storage bin arrangement 202 allows maximum utilization of the entire covered front storage area of the pickup truck bed 22 and floor 212.

From the above description of a preferred embodiments of the invention, those skilled in the art will perceive improvements, changes and modifications. Such improvements, changes and modifications within the skill of the art are intended to be covered by the appended claims.

Having described at least one preferred embodiment of the invention, what is claimed is:

1. A cover for a vehicle bed, said cover comprising:

a frame connectable to a bed of a vehicle;

a first cover portion supported by said frame so as to extend over substantially one-half of the longitudinal extent of the bed, said first cover portion including at least one gull wing door supported to pivot about an axis extending in a direction substantially parallel to the longitudinal extent of the bed; and a second cover portion slidably supported by said frame for telescoping movement between a first closed position covering substantially another one-half of the bed to a second open position located under said first cover portion.

2. The cover of claim 1 wherein said second cover portion further includes an end panel pivotable relative to said second cover portion between open and closed positions to allow or inhibit access to the vehicle bed.

3. The cover of claim 1 further including an actuator and a plunger member between said frame and said second cover portion, said plunger being actuated by said actuator to selectively block and allow movement of said second cover portion relative to said frame.

4. The cover of claim 1 further including a pair of gull wing doors pivotable in opposite directions about a central support of said first cover portion.

5. The cover of claim 1 wherein said second cover portion is adapted to be nested under said first cover portion when said second cover portion is in its second open position.

6. The cover of claim 1 further including a ladder rack supported by said guide frame.

7. The cover of claim 1 further including a storage bin located under said gull wing door in said first cover portion and supported by a floor of the vehicle bed and said first cover portion.

8. The cover of claim 1 further including a tailgate lock attachable to the vehicle bed to selectively block and allow movement of a tailgate of the vehicle bed between an open position which would allow access to the vehicle bed and a closed position inhibiting access to the vehicle bed.

9. The cover of claim 1 wherein said first cover portion is adapted to be located above the forward portion of the vehicle bed.

10. A cover for a vehicle bed, said cover comprising:

a first cover portion connectable to a bed of a vehicle, said first cover portion extending over substantially one-half of the longitudinal extent of the vehicle bed;

a second cover portion slidably supported by said vehicle bed for telescoping movement between a closed position covering substantially another one-half of the bed and an open position adjacent said first cover portion allowing access to the other one-half of the vehicle bed; and at least one door in said first cover portion supported to pivot to an open position allowing access to the vehicle bed when said second cover portion is in its closed position.

11. The cover of claim 10 further including an end panel on said second cover portion and pivotable relative to said second cover portion to inhibit access to the other one-half of the bed when said end panel is in a closed position.

12. The cover of claim 10 further including a pair of gull wing doors pivotable in opposite directions about a central support of said first cover portion.

13. A cover for a vehicle bed, said cover comprising:

a frame connectable to a bed of a vehicle;

a first cover portion supported by said frame to extend over substantially one-half of the longitudinal extent of the bed, said first cover portion including a pair of gull wing doors pivotable in opposite directions about a central support of said first cover portion extending in a direction substantially parallel to the longitudinal extent of the bed;

a second cover portion slidably supported by said frame for telescoping movement between a first position covering substantially another one-half of the bed and a second position located under said first cover portion; and an end panel on said second cover portion, said end panel pivotable relative to said second cover portion to a closed position to inhibit access to the vehicle bed.

* * * * *